(12) United States Patent
Christensen

(10) Patent No.: US 11,221,103 B2
(45) Date of Patent: Jan. 11, 2022

(54) LOCKABLE ARM

(71) Applicant: Bo Christensen, Nordborg (DK)

(72) Inventor: Bo Christensen, Nordborg (DK)

(*) Notice: Subject to any disclaimer, the term of this patent is extended or adjusted under 35 U.S.C. 154(b) by 94 days.

(21) Appl. No.: 16/873,240

(22) Filed: Mar. 3, 2020

(65) Prior Publication Data

US 2021/0278035 A1    Sep. 9, 2021

(51) Int. Cl.
*F16M 11/00* (2006.01)
*F16M 13/02* (2006.01)
*F16H 19/00* (2006.01)

(52) U.S. Cl.
CPC ......... *F16M 13/022* (2013.01); *F16H 19/005* (2013.01); *F16M 13/027* (2013.01); *F16H 2019/008* (2013.01); *F16M 2200/021* (2013.01)

(58) Field of Classification Search
CPC .. F16H 19/005; F16M 13/027; F16M 13/022; F16M 13/02
See application file for complete search history.

(56) References Cited

U.S. PATENT DOCUMENTS

| | | | | |
|---|---|---|---|---|
| 6,227,508 B1* | 5/2001 | Panzarella | ......... | A47B 21/0314 248/118.3 |
| 8,636,257 B2* | 1/2014 | Tsou | ....................... | B60R 11/02 248/288.31 |
| 8,991,755 B2* | 3/2015 | Goodman | ................ | B64D 9/00 244/118.1 |
| 9,243,743 B2* | 1/2016 | Hunter | ................ | F16M 11/048 |
| 10,702,067 B2* | 7/2020 | Acevedo | ................ | F16M 13/00 |
| 2014/0246552 A1* | 9/2014 | Hunter | ................ | F16M 11/048 248/280.11 |
| 2017/0328512 A1* | 11/2017 | Brown | ................ | F16M 13/022 |

* cited by examiner

*Primary Examiner* — Amy J. Sterling
(74) *Attorney, Agent, or Firm* — Mark Ogram

(57) ABSTRACT

A mechanical arm assembly which has two arm members connected by an elbow. The movable connectors at the end of each arm are connected by belts or the like to a locking mechanism at the elbow such that engaging the locking mechanism simultaneously locks both movable connectors as well as the elbow.

18 Claims, 4 Drawing Sheets

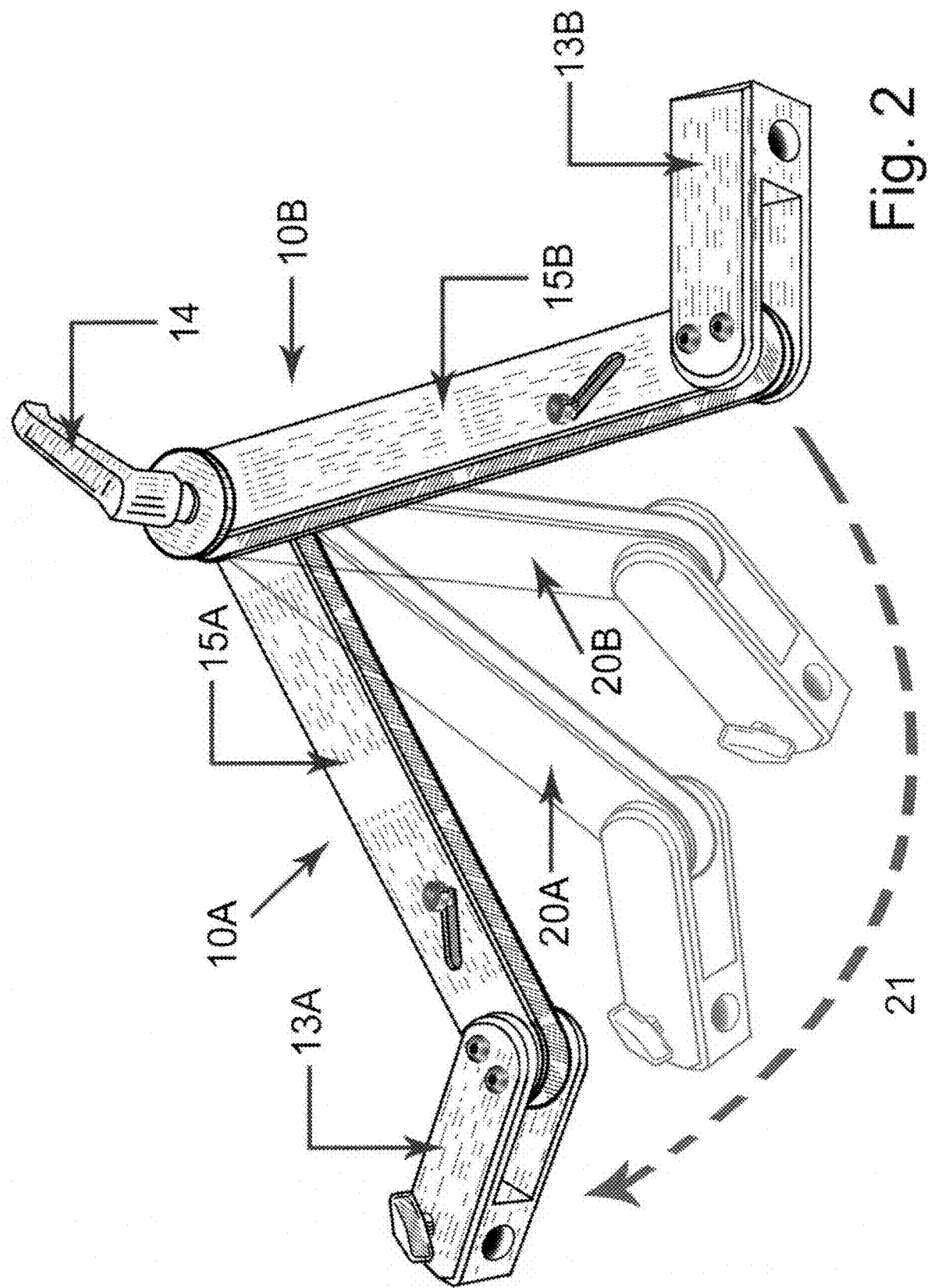

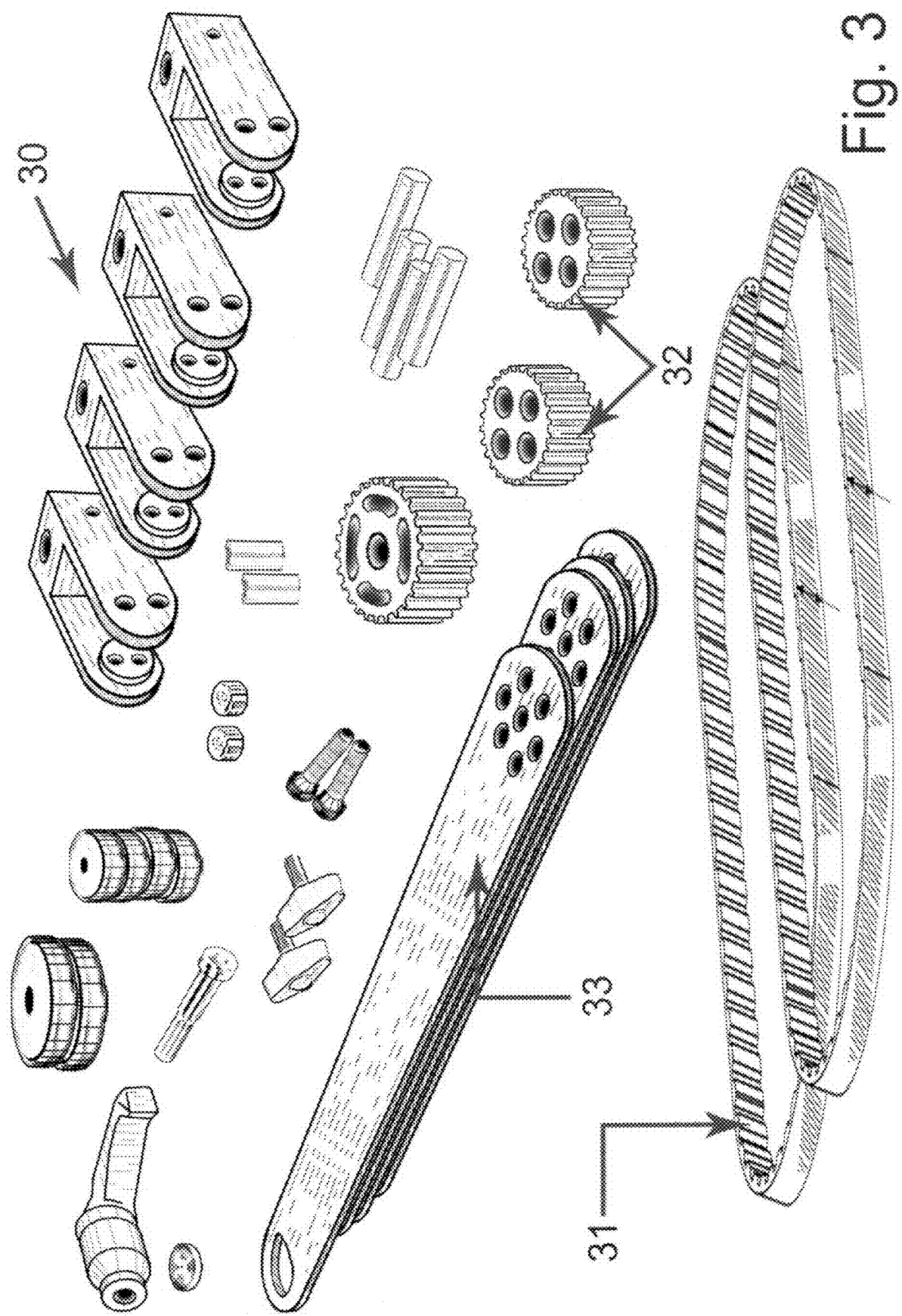

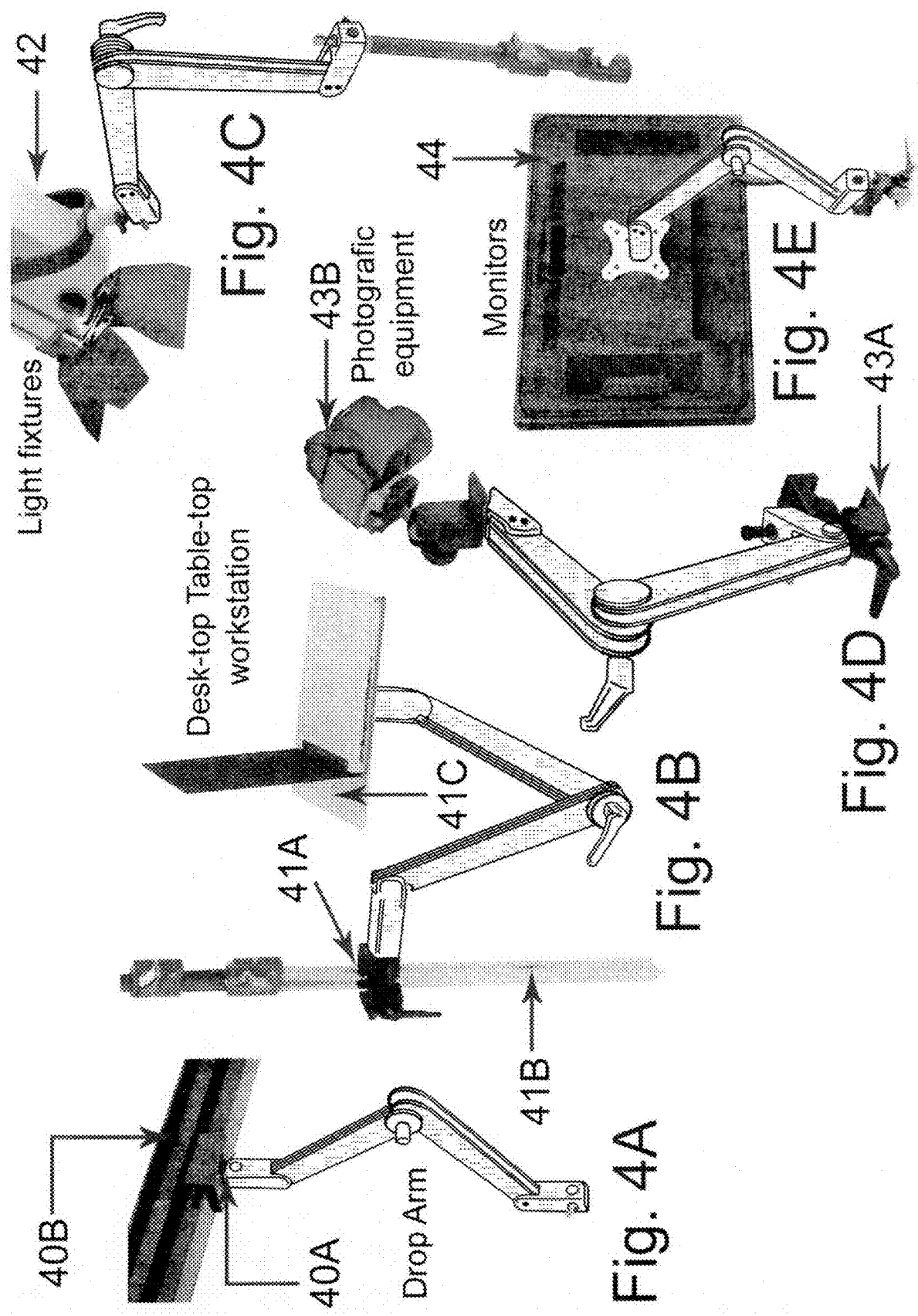

LOCKABLE ARM

PRIORITY

Priority for this case is U.S. Provisional patent application Ser. No. 62/919,677, filed on Mar. 22, 2019, and entitled "Lockable Arm"

BACKGROUND OF THE INVENTION

While the discussion herein relates to photography equipment, the invention is not intended to be limited to this field but has applications in other fields and uses as those of ordinary skill art readily recognize.

Mechanical arms are used in a variety of applications where a camera, lighting fixture, a microphone, or the such needs to be secured in a fixed position to accomplish the task at hand. Typically, the arm, via the elbow is fixed in motion and then the two ends of the arms are fixed. This means that the pivoting joints are tightened one by one which is cumbersome and very time consuming.

An example of such a mechanical arm is described in U.S. Pat. No. 10,352,498, issued on Jul. 16, 2019, to Rieger and entitled "Tool for Multi-Positioning and Holding a Device", and U.S. Pat. No. 10,369,708, issued Aug. 6, 2019, to Kang and entitled "Apparatus and Method for Providing an Adjustable Positive Stop in Space", and, U.S. Pat. No. 10,500,015, issued on Dec. 10, 2019, to Taylor et al. and entitled "Surgical Robotic Arm Support Systems and Methods of Use"; all of which are incorporated hereinto by reference.

Often, after the arm has been "placed", the weight of the camera or light gradually cause the arm to sag and the original aiming of the arm is lost.

It is clear from the foregoing that there is a need for an improved mechanical arm.

SUMMARY OF THE INVENTION

The invention relates to a mechanical arm which is positioned manually and the locked into position by the operator. The mechanical arm employs two arms each having a connector (being manipulated and positioned by the operator) connected to each other using an elbow.

Two belts are used. Each belt extends from the elbow to the connector on the arms. A manually operated locking mechanism, located at the elbow, allows the belts to be "locked" into position to "freeze" or lock the connectors in their positions while simultaneously locking the elbow in position and by extension, both arms.

This allows the use of a single "locking" action by the operator to lock the elbow and both connectors.

In the preferred embodiment, three sprockets are use. The sprocket at the elbow engages both belts while the other sprockets are located at the connectors. When the elbow sprocket is braked/locked, the belts are also braked/locked to brake/lock the other sprockets to brake/lock the connectors.

Ideally, the belts contain teeth which engage the sprockets. Belts of plastic or metal are contemplated in this capacity. Additional belts are contemplated as chains or cables for heavier loads.

The mechanical arm is affixable to a surface such as a table or to an overhead track.

The invention creates a lockable arm which is an articulating arm that locks three pivoting joints with one tightening mechanism. This enables users to hold and guide their equipment with one hand while loosening, adjusting and fastening the arm with the other hand.

The belts actually carry the load. Because of the belt tightening and tensioning, the arm also has far greater load capacity than for example friction arms which usually starts sagging if stretched too far horizontally; hence, the arm is positioned and stays in position. The arm is lightweight yet strong enough to hold equipment in a fixed horizontal position without slowly sagging due to vibration or vertical pressure.

The arm uses synchronous belts to maintain a rigid and accurate position. Various lengths of the arm are contemplated and is ideal for a mounting point for equipment that has to be suspended above a subject.

In the preferred embodiment, each arm can pivot 180 degrees. A scale is provided on one embodiment of the invention to provide accurate repositioning. In the preferred embodiment a scale is positioned on each arm near the elbow.

Due to the simplicity of this arm, it could be relatively inexpensive to produce. The initial tool investment for production is the cast mold, two extrusion dies and one stamping mold. Arm ends are cast aluminum. Belt pulleys ideally are made from extruded aluminum profiles, no further CNC processing necessary. Belt cover arms could be stamped from sheet aluminum.

In this manner, the arm of this invention:
Locks 3 articulating joint/hinges simultaneously with on tightening mechanism;
Is able to hold heavier loads than other articulating arms due to use of belts;
Able to hold them at further distance from mounting point;
Can be used to hold heavy equipment such as monitors or lights;
Quick adjustable position on three axis;
No need to adjust multiple knobs fort three axis positioning.

The invention, together with various embodiments thereof, will be more fully explained by the accompanying drawings and the descriptions thereof.

DRAWINGS IN BRIEF

FIG. 2 is a view of the arm illustrating its motion.

FIG. 3 is an illustration showing the parts used in the preferred embodiment.

FIGS. 4A-4E illustrate the use of the arm in various applications.

DRAWINGS IN DETAIL

Figure 1:
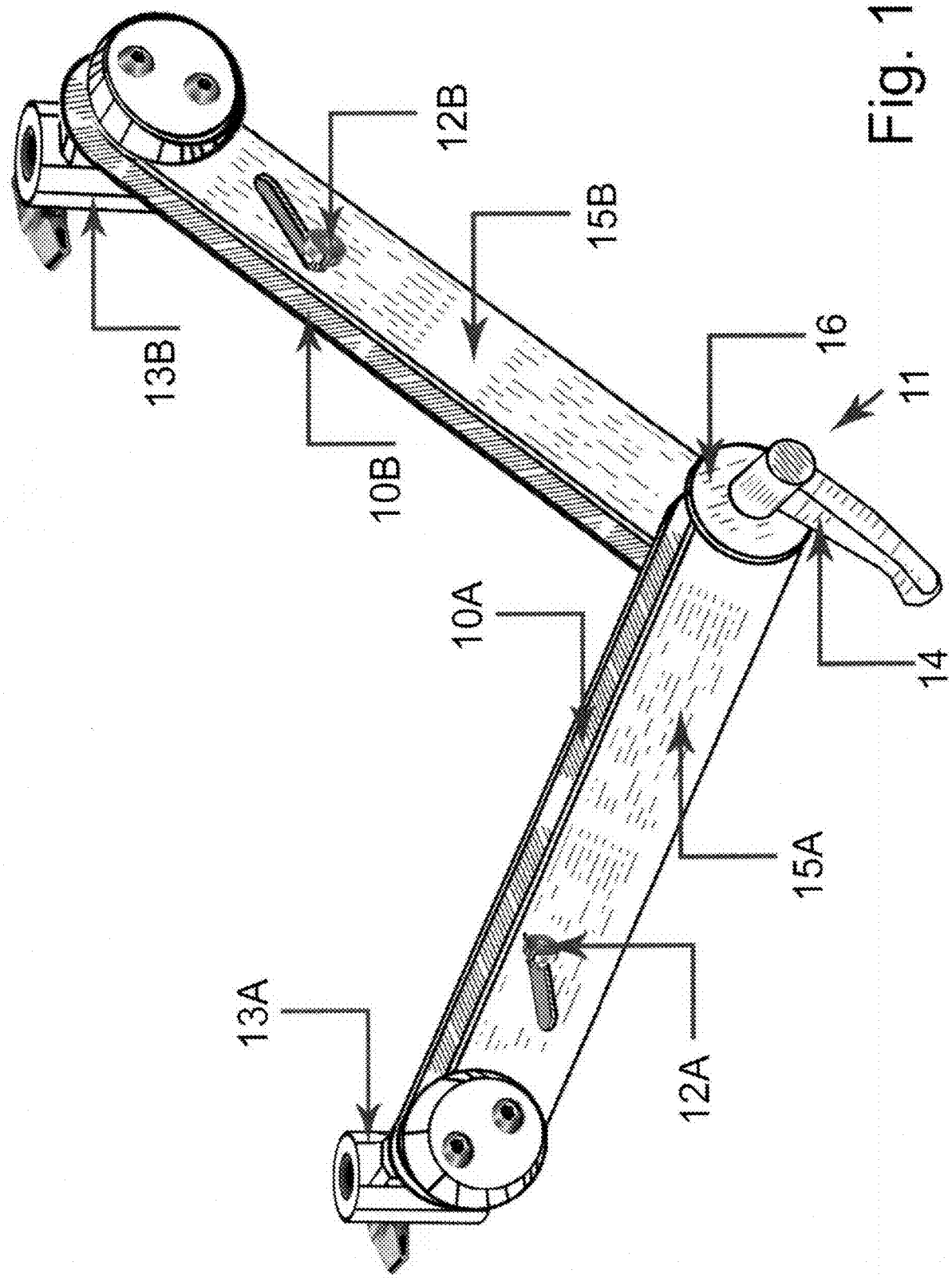
FIG. 1 is a perspective view of the preferred arm.

FIG. 1 is a perspective view of the preferred arm.

The arm has two arm portions 15A and 15B which are connected at their proximal ends via elbow 16.

The arm uses two synchronous belts 10A and 10B that are fixed into position by a center tightening mechanism 11. Tightening mechanism 11 has handle 14 which is manually operated to tighten/lock or release belts 10A and 10B. When belts 10A and 10B are tightened (locked against movement), distal ends of the both arms 13A and 13B are also simultaneously locked.

Belt tensioners 12A and 12B are used to provide tension to the belts to assure proper engagement with the sprockets (not shown). Belt tensioners 12A and 12B may not be needed if tolerances can be kept during manufacture. In one embodiment, belt tensioners 12A and 12B use a cam mechanism (not shown) which press onto belts 10A and 10B to selectively adjust them.

At the distal ends of both arms, are attachments 13A and 13B, which in this illustration, have crossing ⅝ inch pin pass-through mounting hole for mounting in any direction. Other connectors are obvious to those of ordinary skill in the art.

In this manner, the invention provides for a lockable articulating arm that locks three pivoting joints using a single tightening mechanism. This enables the user to hold and guide their equipment with one hand while loosening, adjusting and fastening the arm with the other hand.

Because of the use of belts 10A and 10B, the arm of this invention has a far greater load capacity than friction arms which usually starts sagging if stretched too far horizontally.

In some embodiment, a scales is engraved at each pivot point to enable accurate repositioning.

FIG. 2 is a view of the arm illustrating its motion.

Arm portion 15B is able to move relative to arm portion 15A as shown by arrow 21 to be selectively positioned such as shown by arm portion 20B and arm portion 20A, or any other angle relative to arm portion 15A.

This permits the arm portions 15A and 15B, together with attachments 13A and 13B, to be positioned with one hand of the user and then locked into the chosen position using the other hand operating handle 14.

FIG. 3 is an illustration showing the parts used in the preferred embodiment.

The arm is very simply made and uses synchronous belts to maintain a rigid and accurate position. Due to the simplicity of this arm, it is relatively inexpensive to produce. The initial tool investment for production is the cast mold, two extrusion dies and one stamping mold.

Arm ends 30 are cast aluminum. Synchronous belts 31 (shown earlier as 10A and 10B), or chains, are readily available. Note the teeth in synchronous belts 31 which engage the belt pulleys/sprockets 32. In the preferred embodiment, the belt pulleys/sprockets 32 are ideally made from extruded aluminum profiles to reduce or totally eliminate further CNC processing.

Belt covers 33 are ideally stamped from a sheet aluminum.

With the teeth engaging the sprockets, once assembled, the assembled arm is durable and strong.

FIGS. 4A-4E illustrate the use of the arm in various applications.

The arm of this invention is mountable via a slide 40A into a ceiling rail system 40B (shown in FIG. 4A). A variety of different sized and length of arms is contemplated for this application.

As shown in FIG. 4B, the arm is secured to a pole 41B via attachement 41A with the end of the arm secured to a table top having a workstation, computer or a writing tablet thereon.

FIG. 4C shows the arm used to position a lighting fixture 42. FIG. 4D illustrates arm securable 43A to a table (not shown) with a camera located at the opposing end. FIG. 4E illustrates the arm used to hold a monitor or screen 44 at a desired position.

These figures illustrate that although the arm is lightweight, it is strong enough to hold equipment, even heavy equipment, in a fixed horizontal position without slowly sagging due to vibration or vertical pressure.

It is clear that the present invention provides for an improved arm which has a variety of applications in a variety of industries.

What is claimed is:

1. A mechanical arm comprising:
   a) a first and second arm,
   b) a first and a second positionable connector mechanism, said first positionable connector secured to a second end of the first arm, said second postionable connector secured to a second end of the second arm, said first postionable connector being selectively positionable relative to the first arm, and the second positionable connector being selectively positionable relative to the second arm;
   c) an elbow mechanism secured to a first end of the first arm and a first end of the second arm, said elbow mechanism allowing relative movement between the first and second arms;
   d) a first belt extending between the elbow mechanism and the first positionable connector such that movement of the first positionable connector causes movement of the first belt;
   e) a second belt extending between the elbow mechanism and the second positionable connector such that movement of the second positionable connector causes movement of the second belt;
   f) a manually operated locking mechanism located at the elbow, said manually operated locking mechanism simultaneously engaging the first belt and the second belt such that said locking mechanism is able to simultaneously prevent the first belt and the second belt from movement and the elbow mechanism.

2. The mechanical arm according to claim 1, further including,
   a) a first sprocket engaging the first positionable connector;
   b) a second sprocket engaging the second positionable connector;
   c) a third sprocket engaging the manually operated locking mechanism; and,
   d) wherein the first belt extends around the first sprocket and the third sprocket; and,
   e) wherein the second belt extends around the second sprocket and third sprocket.

3. The mechanical arm according to claim 2, wherein the first belt and the second belt each contain teeth adapted to engage the sprockets.

4. The mechanical arm according to claim 2, further including a mounting mechanism secured to a surface; and, wherein the second positionable connector is securable to the mounting mechanism.

5. The mechanical arm according to claim 4, further including a track; and, wherein the mounting mechanism is secure to the track.

6. The mechanical arm according to claim 3, wherein the track is secured to a ceiling.

7. The mechanical arm according to claim 1, further including an attachment mount and wherein the first positionable connector is securable to the attachment mount.

8. The mechanical arm according to claim 7, wherein the attachment mount is secured to a monitor.

9. A mechanical arm comprising:
   a) a first and second arm connected at their proximal ends via an elbow, said elbow having a manually operated locking mechanism;
   b) a first and a second positionable connector mechanism connected to the distal ends of the first and second arms respectively;
   c) a first belt extending between the locking mechanism and the first positionable connector and a second belt extending between the locking mechanism and the second positionable connector; and, d) wherein engagement of the locking mechanism simultaneously locks the first belt and the second belt to simultaneously prevent the first belt and the second belt from movement as well as the elbow mechanism.

10. The mechanical arm according to claim 9, further including, a) a first sprocket engaging the first positionable connector;

b) a second sprocket engaging the second positionable connector;

c) a third sprocket engaging the manually operated locking mechanism; and, d) wherein the first belt extends around the first sprocket and the third sprocket; and, e) wherein the second belt extends around the second sprocket and third sprocket.

11. The mechanical arm according to claim 10, wherein the first belt and the second belt each contain teeth adapted to engage the sprockets.

12. The mechanical arm according to claim 11, wherein the first belt and the second belt are made of flexible material.

13. The mechanical arm according to claim 11 wherein the first belt and the second belt are metal.

14. A mechanical arm comprising:

a) a first and second arm connected by an elbow at a proximal end, each arm having a connector at a distal end thereof;

b) a first belt extending between the elbow mechanism and the connector of the first arm such that movement of the t connector of the first arm causes movement of the first belt;

c) a second belt extending between the elbow mechanism and the connector of the second arm such that movement of the connector of the second arm causes movement of the second belt; and, d) a manually operated locking mechanism located at the elbow, said manually operated locking mechanism simultaneously engaging the first belt and the second belt adapted to lock the first belt and the second belt in a stationary position.

15. The mechanical arm according to claim 14, further including, a) a first sprocket engaging the positionable connector of the first arm;

b) a second sprocket engaging the positionable connector of the second arm;

c) a third sprocket engaging the manually operated locking mechanism; and, d) wherein the first belt extends around the first sprocket and the third sprocket; and, e) wherein the second belt extends around the second sprocket and third sprocket.

16. The mechanical arm according to claim 15, wherein the first belt and the second belt each contain teeth adapted to engage the sprockets.

17. The mechanical arm according to claim 16, wherein the first belt and the second belt are made of flexible material.

18. The mechanical arm according to claim 16 wherein the first belt and the second belt are metal chains.

* * * * *